United States Patent
Seo et al.

(10) Patent No.: US 6,418,315 B1
(45) Date of Patent: Jul. 9, 2002

(54) METHOD OF REGISTRATION REQUEST OF A MOBILE SWITCHING CENTER

(75) Inventors: Bong-sik Seo, Wonjoo; Hyun-yung Cha, Seoul, both of (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/312,227

(22) Filed: May 14, 1999

(30) Foreign Application Priority Data

May 14, 1998 (KR) .............................................. 98-17373

(51) Int. Cl.[7] .................................................. H04Q 7/20
(52) U.S. Cl. ........................................ 455/435; 455/466
(58) Field of Search .............................. 455/435, 411, 455/422, 456, 466

(56) References Cited

U.S. PATENT DOCUMENTS

| | | | | |
|---|---|---|---|---|
| 5,642,398 A | * | 6/1997 | Tiedemann, Jr. et al. ... | 455/435 |
| 5,787,349 A | * | 7/1998 | Taketsugu .................... | 455/435 |
| 5,818,824 A | * | 10/1998 | Lu et al. ...................... | 455/432 |
| 5,826,195 A | * | 10/1998 | Westerlage et al. ......... | 455/456 |
| 5,884,172 A | * | 3/1999 | Sawyer ........................ | 455/435 |
| 6,188,892 B1 | * | 2/2001 | Krishnamurthi et al. .... | 455/422 |
| 6,918,929 | * | 3/2001 | Krishnamurthi et al. .... | 455/439 |

* cited by examiner

*Primary Examiner*—William Trost
*Assistant Examiner*—Simon Nguyen
(74) *Attorney, Agent, or Firm*—Dilworth & Barrese, LLP

(57) ABSTRACT

In a mobile telecommunication system that includes a base station providing communication service to a plurality of mobile stations moving within service coverage areas and a mobile switching center (MSC) connecting the base station to a public switched telephone network (PSTN), a method for the mobile switching center to send a registration request order message to the base station requesting one of the plurality of mobile stations to register. The registration request order message includes message type information, cell identifier list information, mobile identity information, slot cycle index information and signaling type information.

14 Claims, 2 Drawing Sheets

FIG. 3

| INFORMATION ELEMENT | DIRECTION | TYPE |
|---|---|---|
| MESSAGE TYPE | MSC -> BS | M |
| MOBILE IDENTITY(MIN/IMSI/ESN) | MSC -> BS | M |
| CELL IDENTIFIER LIST | MSC -> BS | O |
| MOBILE IDENTITY(ESN) | MSC -> BS | O |
| SLOT CYCLE INDEX | MSC -> BS | O |
| SIGNALING TYPE | MSC -> BS | O |

METHOD OF REGISTRATION REQUEST OF A MOBILE SWITCHING CENTER

BACKGROUND OF THE INVENTION

1. Field of the Invention

The present invention relates generally to wireless telecommunications, and more particularly, to a method for transmitting a registration request order message from a mobile switching center to a base station in a personal communication services (PCS) system satisfying IS-634/TSB-80 as an A-interface standard.

2. Description of the Related Art

Referring initially to FIG. 1 which illustrates a registration process in accordance with the prior art, a cellular system generally designated as 10 is shown comprising a plurality of mobile stations 100, a base station 200 for providing wireless service to the plurality of mobile stations within the service coverage area, a mobile switching center (MSC) 300 connected to the base station by a cable and a public switching telephone network (PSTN) 400 for connecting the mobile switching center 300 to wire telephone network.

Interim Standard IS-95A/B(J-STD-008) has been adopted by the Telecommunications Industry Association (TIA) for implementing CDMA in a cellular system. The TIA/IS-95 standard is an interface standard for, inter alia, interfacing mobile stations with a base station, as illustrated in FIG. 1. The TIA/IS-95 standard defines call processing which is classified into two parts, mobile station call processing and base station call processing. A component of mobile station call processing, relevant to the present application, concerns the process of registration. Registration is the process by which the mobile station notifies the base station of its location, status, identification, slot cycle, station class, and other pertinent characteristics. The mobile station informs the base station of its location and status so that the base station can efficiently page the mobile station in accordance with the provided location and status data. The mobile station may transmit registration information either autonomously or as initiated by the base station through an order message (i.e. order registration).

An ordered registration can be ordered by a base station or by an MSC via a base station. In the first case, when a base station orders a mobile to register, the base station sends a registration request order message to a mobile station to which the mobile station responds by performing registration. In a base station ordered registration, the mobile station 100 first enters the update overhead information substate of the system access state with a registration indication within $T_{35m}$=0.3 seconds after the registration request order is received. $T_{35m}$ is the maximum time to enter the update overhead information substate of the system access state to respond to messages received while in the mobile station idle state (except authentication messages). Then the mobile station 100 enters the registration access substate and transmits a registration message to the base station 200. In contrast, when an MSC 300 attempts to execute an ordered registration via a base station, no message protocol is defined by the A-interface standard.

Before an MSC transmits a registration request order message to the base station in order to solicit a registration response from the mobile station, the MSC must first request that the mobile station registers via the base station Currently, in the conventional A-interface standard no such message format is provided. Further, service providers have each defined their own proprietary message formats for just such use. As a result, message formats provided from the various service providers are incompatible.

Therefore, a need exists for a standardized message format for a registration request order message to be made available for use by all service providers.

SUMMARY

It is a primary object of the present invention to provide a method for requesting registration of a mobile station by a mobile switching center (MSC), via a base station, by defining the format of a registration request order message sent from the MSC to the base station.

It is another object of the present invention to provide a method for transmitting the information necessary to register the mobile station.

In one aspect of the present invention, a method for requesting registration of a mobile station by an MSC via a base station in a mobile telecommunication system is provided wherein the base station provides communication services to corresponding mobile stations and the mobile switching center connects the base station to a public switched telephone network (PSTN). The method comprises the steps of: sending a registration request order message from the MSC via the base station to request registration of a mobile station. The registration request order message may include, inter alia, message type information for identifying messages, cell identifier list information, mobile identity information of the mobile station to be requested to register, slot cycle index information representing time slot information of the paging channel containing the message and signaling type information.

In accordance with another aspect of the present invention, a method for requesting registration of a mobile station by a MSC via a base station comprises the steps of sending a registration request order message from the MSC to the base station, the base station extracting necessary information from the registration request order message, and requesting registration of a mobile station.

In accordance with a further aspect of the present invention, a method for requesting registration of a mobile station by an MSC via a base station comprises the steps of: sending cell identifier list information from a mobile station to the base station, sending mobile identity information of the mobile station to which the registration request was made, to the base station; and sending slot cycle index information representing time slot information of the paging channel containing the message from the mobile station to the base station.

BRIEF DESCRIPTION OF THE DRAWINGS

The above objects and advantages will become more readily apparent from the following detailed description of the preferred embodiments, taken in conjunction with the drawings, in which:

FIG. 3 is a table illustrating the format of a registration request order message according to the present invention.

DETAILED DESCRIPTION OF THE PREFERRED EMBODIMENTS

In a personal communication services (PCS) system in accordance with the IS-634/TSB/80/IS-634A A-interface standard, the present invention defines a message format for a registration request order message directed to performing a registration function.

Figure 1:
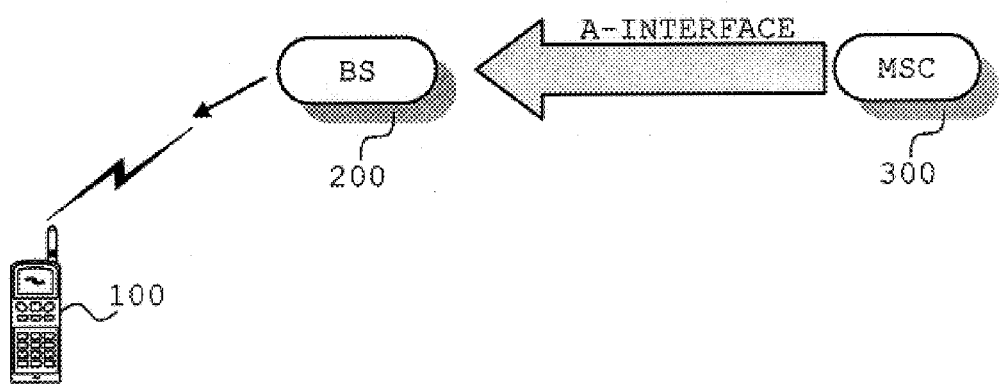
FIG. 1 is a schematic view illustrating a registration process according to the prior art.
Figure 2:
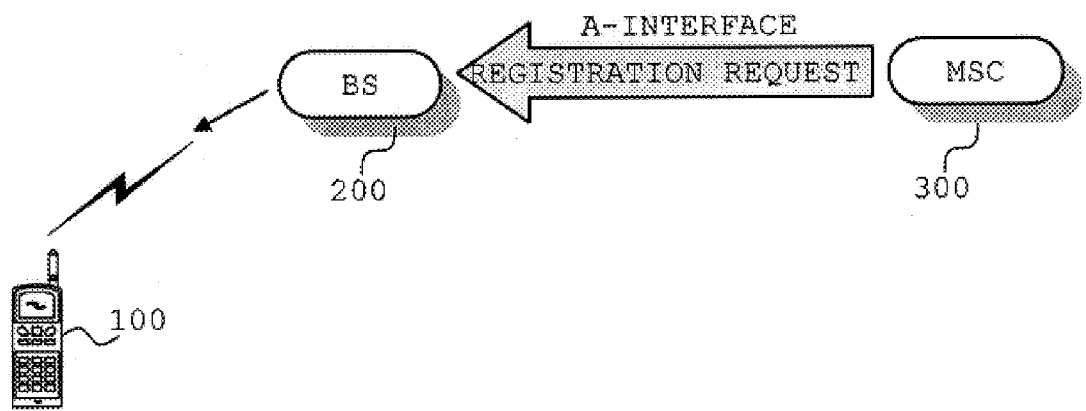
FIG. 2 is a schematic view illustrating a registration process according to the present invention.

Referring now to the drawings, in which the reference numerals refer to like or similar elements throughout the several views, FIG. 2 is a schematic view illustrating a registration process according to the present invention. As illustrated, a mobile switching center 300 satisfying IS-634/TSB-80/IS-634A (B) as A-interface standard, sends a registration request order message to a base station 200 to require registration.

A base station application part (BSAP), defined by the A-interface, can be generally divided into a direct transfer application part (DTAP) and a base station management application part (BSMAP). The registration request order message of the present invention follows the message protocol of the BSMAP.

Further, in accordance with the present invention, the request order message includes element identifier fields containing information required by the registration request order message, as set forth in FIG. 3, which is a table illustrating the message format for the registration request order message according to the present invention. Each field is explained in detail below:

1. message type field: is used for identifying a number of messages transmitted from an MSC to a base station. The IS-634/TSB-80 standard defines the message type as an unused field because the registration request order message is not defined. The message type field assumes values corresponding to various MSC messages, for example, an MSC requesting a base station to set up a call (0001), or requesting a base station to register (0002).

2. cell identifier field: is a list of cells to which the registration request order message is to be transferred. A base station uses the cell identifier list to determine which cells (i.e., mobile station) the registration request order message to be transferred.

3. mobile identity field (MIN/IMSI/ESN): includes a mobile identity number (MIN), an international mobile station identity (IMSI), and an electrical serial number (ESN) corresponding respectively to the address/addr_len/addr_type fields of a registration request order message. The MIN/IMSI and ESN fields are used for identifying a mobile station for which registration is to be performed.

4. slot cycle index field: is a parameter for calculating a time-slot of a paging channel. The paging channel is divided into 80 ms slots called paging channel slots. A mobile station can operate in slotted or non-slotted mode. A mobile station that monitors the paging channel only during certain assigned slots is referred to as operating in the slotted mode. The slotted mode is used for power conservation. In the slotted mode a mobile station generally monitors the paging channel for one or two slots per slot cycle. The mobile station can specify its preferred slot cycle using the slot-cycle index field.

5. Signaling type field: stores types of standards used is the air-interface. More particularly, when a base station commanded by an MSC sends a registration request order message via A-interface, the signaling type field contained in the message indicates which standard of air-interface defines the message.

Because the message type and the mobile identity (i.e. MIN/IMSI/ESN) are mandatory elements of the message, they are indicated as type M in the table in FIG. 3. Optional fields, as indicated by type O in FIG. 3 include the cell ID list, mobile identity (ESN), the slot cycle index and the signaling type fields.

A preferred embodiment of the present invention will be explained with reference to FIGS. 2 and 3. Referring initially to FIG. 2, a mobile switching center (MSC) 300 transmits a registration request order message to a base station 200, wherein the message is defined in accordance with the present invention. After the base station 200 receives the message, the base station 200 extracts necessary information from the received message and transmits the registration request order message in turn to a mobile station 100 whose identity is included as part of the transmitted message.

The base station 200 performs registration of the mobile station whose identity is determined by the mobile identity field (i.e. MIN/IMSI/ESN) of the received message. The message is also transferred to neighboring base stations which receive a signal of the mobile station so as to prevent the registration request message from being lost and not reaching the mobile station. In other words, the message is transferred to other cells listed in a cell identifier list and carried on a slot defined by the slot cycle index field.

When the base station 200 transmits the registration request order message to the mobile station 100, the mobile station 100 receives the message, transmits a registration message to the base station 200 and receives a registration accepted order or registration rejected order message from the base station 200, thereby terminating the registration order.

Once a registration request order message is defined in a cellular system employing the A-interface IS-634/TSB-80/IS-634A standard, the defined registration request order message may be used to obtain registration information of a mobile station, whenever required by the system. Therefore, registration and paging processes of a mobile station and paging are performed more effectively. In addition, defining a registration request order message enables interfacing between the various service providers utilizing non-standardized hardware.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention. All such changes and modifications are intended to be included within the scope of the invention as defined by the appended claims.

What is claimed is:

1. A method for making a registration request by a mobile switching center (MSC) in a mobile telecommunication system including a base station serving a plurality of mobile stations, said mobile switching center connecting said base station to a public switched telephone network (PSTN), the method comprising the steps of:

sending a first registration request order message from the MSC to the base station, said base station extracting necessary information from the first registration; and forwarding a second registration request order message from the base station to one of said plurality of mobile stations, wherein the second registration request order message is generated from extracted information and a format of the first registration request order message is defined by a plurality of fields including:

a message type information field for identifying messages;

a mobile identity information field to identify one of said plurality of mobile stations from which said MSC requests registration;

a cell identifier field identifying cells to which said message is to be transmitted;

a slot cycle index information field representing time slot information of a paging channel containing said message; and a signaling type information field which includes an air-interface standard for interfacing between mobile stations and said mobile telecommunication system, wherein said air-interface standard defines the second registration request order message.

2. A method of registration request as set forth in claim 1, wherein the first registration request order message format is in accordance with a message format of a base station management application part (BSMAP) defined as part of an A-interface of an IS-634/TSB-80 standard.

3. A method of registration request as set forth in claim 1, wherein said message type information corresponds to an order field of said second registration request order message in air-interface for interfacing between said mobile stations and said mobile telecommunication system.

4. A method of registration request as set forth in claim 1, wherein said mobile identity information field corresponds to an "address/address length" field of said second registration request order message in air-interface.

5. A method of registration request as set forth in claim 4, wherein said mobile identify information field further comprises an international mobile station identity (IMSI) of one of said plurality of mobile stations being requested to register.

6. A method of registration request as set forth in claim 4, wherein said mobile identity information field further comprises an electronic serial number (ESN) of a mobile station being requested to register.

7. A method of registration request as set forth in claim 1, wherein said mobile identity information field includes a mobile identity number (MIN) of one of said plurality of mobile stations being requested to register.

8. A method for making a registration request by a mobile switching center (MSC) in a mobile telecommunication system including a base station to serve a plurality of mobile stations, said mobile switching center connecting said base station to a public switched telephone network (PSTN), the method comprising the steps of:

sending a first registration request order message from said mobile switching center to said base station, said first registration request order message including an air-interface standard for interfacing between mobile stations and said mobile telecommunication system, said base station extracting necessary information from the first registration request order message; and requesting registration of a mobile station by transmitting a second registration request order message to said mobile station, wherein the second registration request order message is generated from extracted information and defined by said air-interface standard.

9. A method of registration request as set forth in claim 8, wherein the first registration request order message is in a format in accordance with a base station management application part (BSMAP) format defined as part of an A-interface of the IS-634/TSB-80 standard.

10. A method of registration request as set forth in claim 8, wherein said registration request order message includes:

cell identifier list information listing cells that the first registration request order message is transmitted to;

mobile identity information of one of said plurality of mobile stations to be requested to register; and slot cycle index information representing time slot information of a paging channel containing said message.

11. A method of registration request as set forth in claim 10, wherein said mobile identity information includes a mobile identity number (MIN) of one of said plurality of mobile stations being requested to register.

12. A method of registration request as set forth in claim 10, wherein said mobile identify information further comprises an international mobile station identity (IMSI) of one of said plurality of mobile stations being requested to register.

13. A method of registration request as set forth in claim 10, wherein said mobile identity information further comprises an electronic serial number (ESN) of one of said plurality of mobile station which is requested to register.

14. A method of registration request as set forth in claim 1, wherein said mobile identity information field corresponds to an "address/address length" field of said second registration request order message in air-interface.

* * * * *